(12) United States Patent
McNamara et al.

(10) Patent No.: US 6,443,296 B1
(45) Date of Patent: Sep. 3, 2002

(54) CONVEYOR RATCHETING APPARATUS

(75) Inventors: Jason A. McNamara, Wyandotte; Gerald A. Brown, Roseville, both of MI (US)

(73) Assignee: Unova IP Corp., Woodland Hills, CA (US)

( * ) Notice: Subject to any disclaimer, the term of this patent is extended or adjusted under 35 U.S.C. 154(b) by 0 days.

(21) Appl. No.: 09/628,890

(22) Filed: Jul. 31, 2000

(51) Int. Cl.$^7$ ............................................... B65G 23/00
(52) U.S. Cl. .................................... 198/832.1; 198/833
(58) Field of Search .............................. 40/343.1, 343.2, 40/736, 747, 749, 468.9, 832, 832.1, 832.2, 833

(56) References Cited

U.S. PATENT DOCUMENTS

| | | | |
|---|---|---|---|
| 2,072,840 A | * 3/1937 | Temple | 198/832.1 |
| 3,263,316 A | * 8/1966 | Schrader | 198/832.1 |
| 3,860,108 A | * 1/1975 | Fafaglia | 198/203 |
| 4,048,868 A | * 9/1977 | Lock | 74/436 |
| 4,116,328 A | * 9/1978 | Horvath et al. | 198/648 |
| 4,619,141 A | 10/1986 | Yoshieda et al. | 73/865.9 |
| 4,872,548 A | * 10/1989 | Masuda et al. | 198/859 |
| 5,058,723 A | * 10/1991 | Hosch | 198/372 |
| 5,381,888 A | * 1/1995 | Benson et al. | 198/832.1 |
| 5,836,437 A | 11/1998 | Saito et al. | 198/396 |
| 6,032,845 A | * 3/2000 | Piccone et al. | 226/139 |
| 6,164,437 A | * 12/2000 | Brown et al. | 198/832.1 |

* cited by examiner

Primary Examiner—Robert J Oberleitner
Assistant Examiner—Benjamin A. Pezzlo
(74) Attorney, Agent, or Firm—Reising, Ethington, Barnes, Kisselle, Learman & McCulloch, P.C.

(57) ABSTRACT

A conveyor ratcheting apparatus for advancing a conveyor in one direction in discrete steps. A ratchet arm is pivotally supported on a frame. A ratchet actuator drives the arm reciprocally between first and second positions. A ratchet wheel is rotatably supported on the frame. Circumferentially spaced teeth are formed around an outer rim of the ratchet wheel. The ratchet arm sequentially engages each of the teeth and causes the ratchet wheel to rotate in one direction each time the ratchet arm engages one of the teeth and moves toward the second position from the first position. The ratchet arm disengages whenever the ratchet arm moves from the second position back toward the first position. A detent engagement member is supported on the frame and is moveable into engagement with one of four stop detents in the ratchet wheel when the first ratchet arm is in the second position. The detent engagement member positively holds the ratchet wheel and allows ratchet wheel rotation out of the second position only after being disengaged. An actuator is operatively connected to the detent engagement member and disengages the detent engagement member in response to ratchet arm movement and before the ratchet wheel is rotated out of the second position.

14 Claims, 5 Drawing Sheets

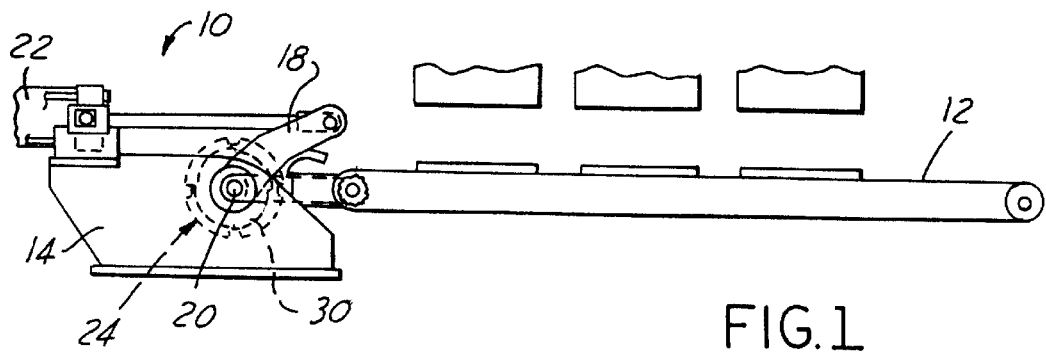
FIG. 1
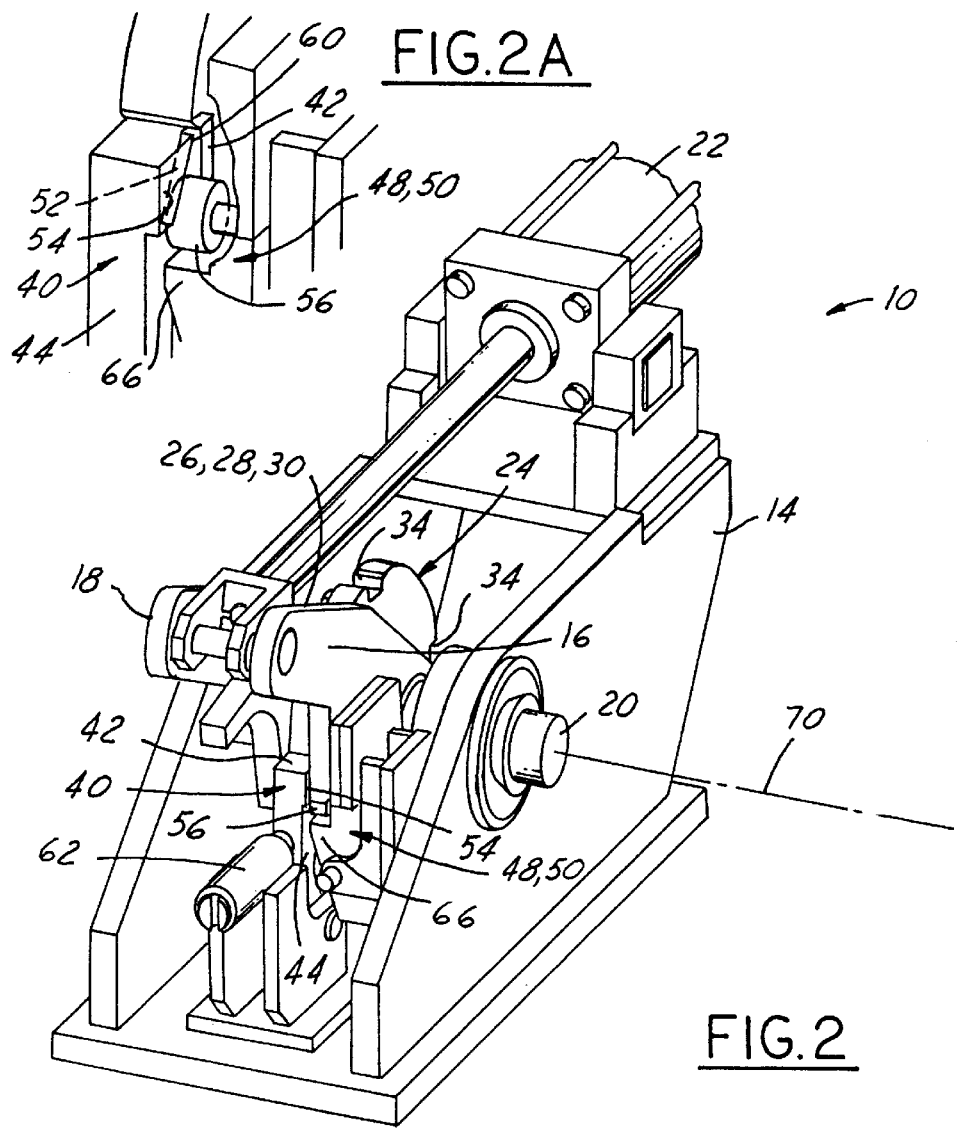
FIG. 2A
FIG. 2

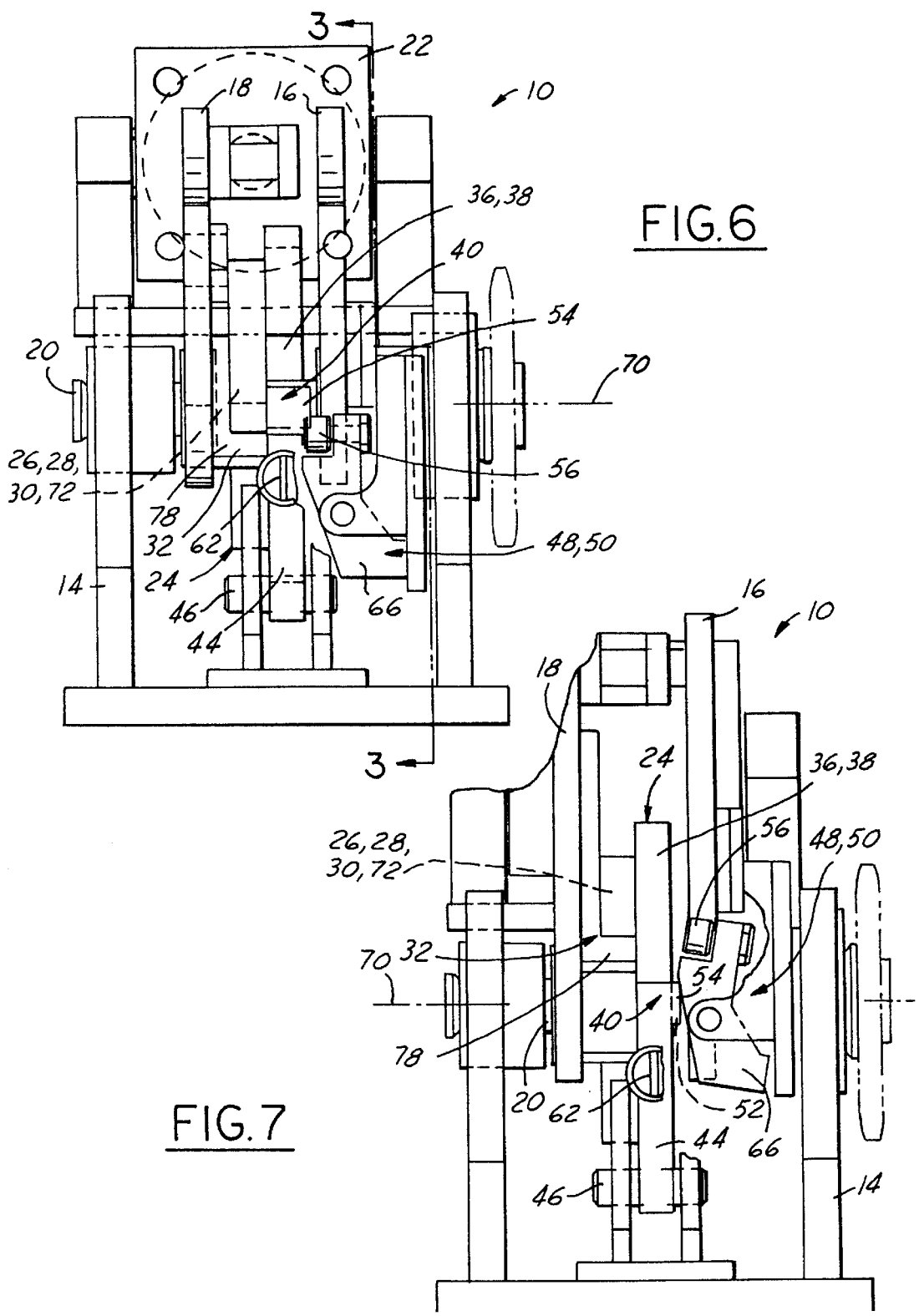

CONVEYOR RATCHETING APPARATUS

TECHNICAL FIELD

This invention relates generally to a conveyor ratcheting apparatus for advancing a conveyor in one direction in discrete steps.

BACKGROUND OF THE INVENTION

Conveyor ratcheting apparati for advancing conveyors in one direction in discrete steps are known in the art. A typical conveyor ratcheting apparatus includes an indexer that operatively connects to and drives a conveyor over discrete distances to align or index objects supported on the conveyor with consecutive work stations. For example, a plurality of pallets may be supported on the conveyor and the indexer drives the conveyor intermittently to move the pallets to dwell positions at one or more work stations disposed along the conveyor. The indexer may include a ratchet arm pivotally supported on a main shaft that is in turn supported on a frame. Ratchet arms are generally supported for pivotal movement relative to the frame through an arc of approximately 90 degrees. It is known to drive such a ratchet arm through its arc using a linear actuator such as a hydraulic or pneumatic cylinder. It is also known for a conveyor ratcheting apparatus to include a ratchet wheel having teeth formed at spaced locations around an outer circumference of the ratchet wheel. The ratchet arm of such an apparatus generally includes a pawl that engages the teeth and causes the ratchet wheel to rotate in one direction as the ratchet arm moves in one direction through its arc and disengage from the teeth as the ratchet arm reverses direction along the same arc.

One problem experienced with conveyor ratcheting apparati of this type is that they may be unable to positively hold an indexing drive mechanism in its dwell or stopped positions rigidly enough to suit certain applications. This inability to positively stop conveyor motion is often due to the significant moment of inertia generated by a moving, laden conveyor. It is also difficult to positively lock an indexing drive against reactive forces that a conveyor can apply to the indexing drive once stopped—forces that otherwise tend to shift the conveyor out of desired dwell positions.

To provide improved rigidity in conveyor dwell positions, the assignee designed a conveyor ratcheting apparatus includes a frame and a ratchet arm supported on a main shaft on the frame for pivotal movement relative to the frame between first and second angularly-spaced positions. The ratchet arm is driven between the first and second positions (an angular distance of approximately 90 degrees) by a ratchet arm actuator cylinder. This conveyor ratcheting apparatus includes a ratchet drive wheel rotatably supported on the main shaft adjacent the ratchet arm. The ratchet drive wheel is configured to drivingly connect to a conveyor drive wheel via a chain loop. The ratchet drive wheel includes four circumferentially-spaced axially-oriented pin receiving holes. A drive pin actuator cylinder extends a drive pin through a hole in the ratchet arm and into one of the pin receiving holes in the ratchet drive wheel when the arm is in the first position. The drive pin actuator cylinder retracts the drive pin when the arm is in the second position. The drive pin actuator cylinder therefore allows the ratchet arm to rotate the ratchet wheel in only one direction and only when the arm moves from the first to the second position. A locking pin actuator cylinder is also fixed to the frame. The locking pin actuator cylinder extends a locking pin into one of the pin receiving holes whenever the ratchet arm reaches the second position. The locking pin actuator also retracts the locking pin whenever the arm has returned to the first position. The locking pin positively locks the ratchet drive wheel against rotation and the attached conveyor against movement while the arm is returning to the first position from the second position.

What is needed is a conveyor ratcheting apparatus that can accurately and positively hold an indexing drive mechanism and an attached laden conveyor in dwell positions despite the significant moment of inertia generated by such a conveyor and despite any reactive forces that the conveyor may apply to the indexing drive once stopped. What is also needed is such a conveyor ratcheting apparatus that is robust and easy to construct and operate.

SUMMARY OF THE INVENTION

The invention is a conveyor ratcheting apparatus for advancing a conveyor in one direction in discrete steps. The apparatus includes a first ratchet arm pivotally supported on a frame for movement relative to the frame between first and second radially-spaced positions. The ratchet arm is configured to be driven between the first and second positions by a ratchet actuator. The conveyor ratcheting apparatus also includes a ratchet wheel rotatably supported on the frame and including at least two circumferentially spaced teeth. The ratchet arm is configured to sequentially engage each of the teeth and to cause the ratchet wheel to rotate in one direction each time the ratchet arm engages one of the teeth and moves toward the second position from the first position. The ratchet arm is configured to disengage each time the ratchet arm moves from the second position to return to the first position. A first ratchet wheel stop detent is formed in the ratchet wheel. A detent engagement member is movably supported on the frame in a position to be moveable into engagement with the first ratchet wheel stop detent when the first ratchet arm is in the second position. The detent engagement member is configured to positively hold the ratchet wheel when engaged with the first ratchet wheel stop detent and to allow ratchet wheel rotation out of the second position only after being disengaged from the ratchet wheel stop detent. An actuator is operatively connected to the detent engagement member and is configured to disengage the detent engagement member from the ratchet wheel stop detent before the ratchet wheel is rotated out of the second position. The actuator is configured to disengage the detent engagement member from the ratchet wheel stop detent in response to ratchet arm movement.

Objects, features and advantages of this invention include the ability to accurately and positively hold an indexing drive mechanism in its dwell positions without using a complex externally-driven actuator system, eliminating the need for an external actuator drive mechanism to engage the detent engagement member, and reducing the number and complexity of components that must be purchased or fabricated to positively hold a conveyor in its dwell positions.

BRIEF DESCRIPTION OF THE DRAWINGS

These and other objects, features and advantages of this invention will be apparent from the following detailed description of the preferred embodiment(s) and best mode, appended claims, and accompanying drawings in which:

FIG. 1 is a side view of a conveyor ratcheting apparatus constructed according to the invention and operatively connected to a conveyor system;

FIG. 2 is a perspective view of the conveyor ratcheting apparatus of FIG. 1;

FIG. 6 is an end view of the conveyor ratcheting apparatus of FIG. 1 showing a roller and lever of the apparatus in an aligned position; and FIG. 7 is a fragmentary, partially cut-away end view of the conveyor ratcheting apparatus of FIG. 1 showing the roller and lever in a non-aligned position.

DETAILED DESCRIPTION

Figure 3:
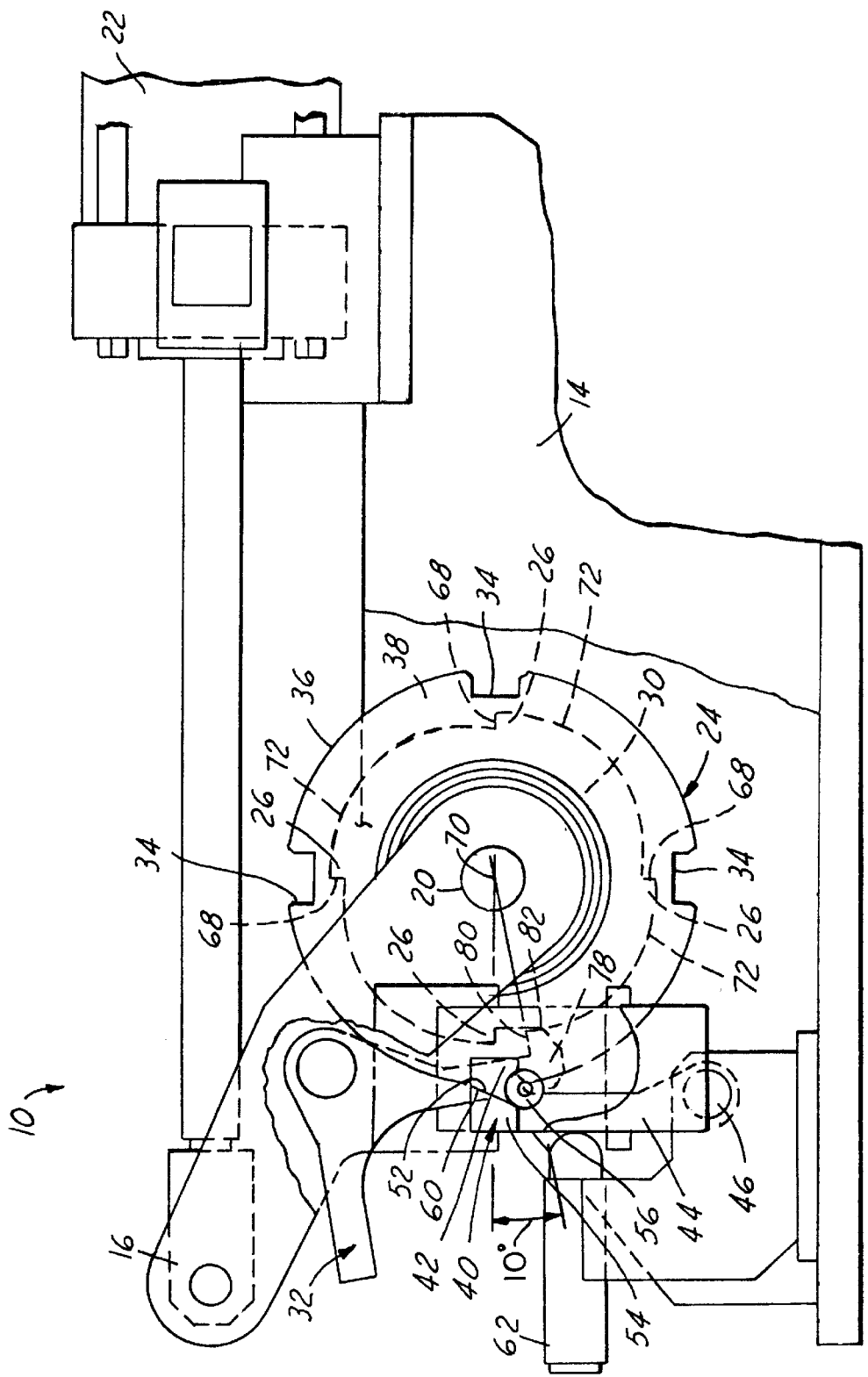
FIG. 3 is a fragmentary side view of the conveyor ratcheting apparatus of FIG. 1 shown with ratchet arms in a first position and with a side wall of a frame portion of the apparatus removed for clarity.
Figure 4:
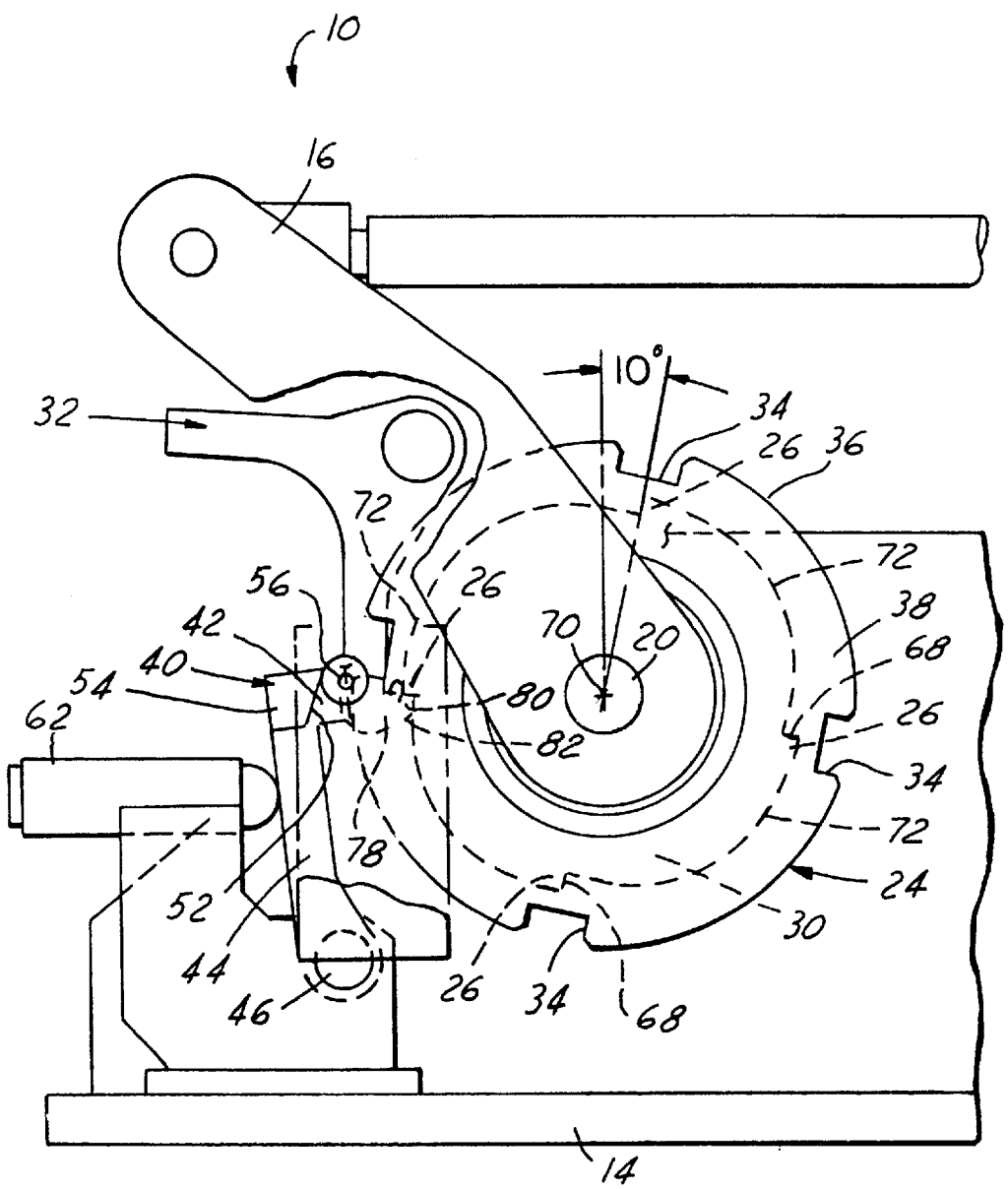
FIG. 4 is a fragmentary, partially cut-away side view of the conveyor ratcheting apparatus of FIG. 1 shown with the ratchet arms rotated 10 degrees along a forward stroke of the ratchet arms between the first position shown in FIG. 3 and a second position shown in FIG. 5 and with the frame side wall removed for clarity.
Figure 5:
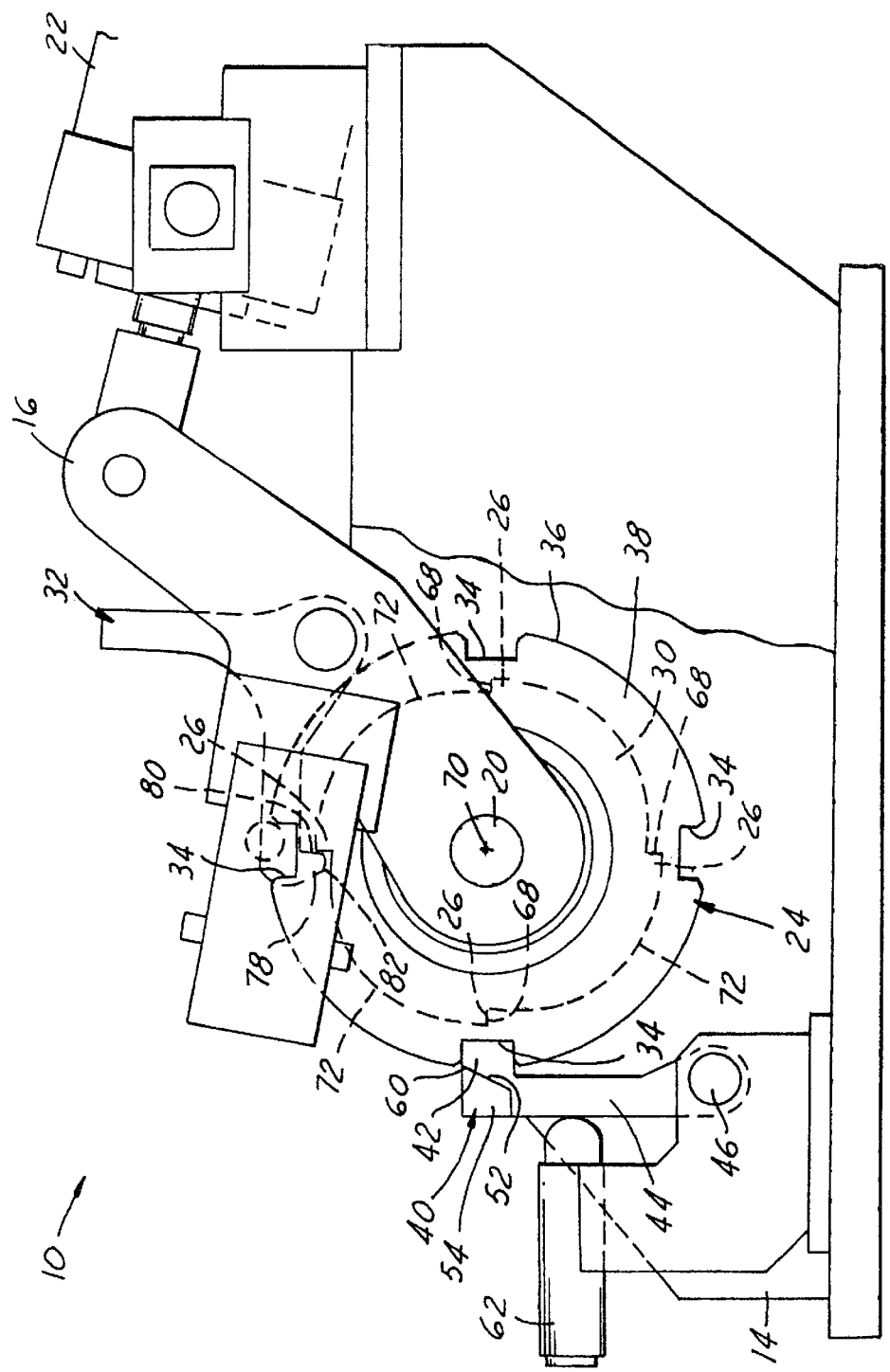
FIG. 5 is a fragmentary, partially cut-away side view of the conveyor ratcheting apparatus of FIG. 1 shown with the ratchet arms in the second position rotated 100 degrees to the end of the forward stroke and with the frame side wall removed for clarity.

A conveyor ratcheting apparatus 10 constructed according to the invention to advance a conveyor 12 in one direction in discrete steps is shown at 10 in the Figures. The apparatus 10 includes a frame 14 and a pair of ratchet arms 16, 18 pivotally supported on a horizontal main shaft 20 for movement relative to the frame 14 that rotatably supports the main shaft 20. The main shaft 20 supports the ratchet arms 16, 18 for pivotal movement between first and second radially-spaced positions best shown in FIGS. 3 and 5, respectively. A reciprocating ratchet drive 22 is mounted on the frame 14 and moves the ratchet arms 16, 18 between the first and second positions. The ratchet drive 22 may be any one of a number of reciprocating rotary or linear drives known in the art to include hydraulic or pneumatic cylinders.

The apparatus 10 also includes a ratchet wheel 24 that is rotatably supported on the frame 14 between the ratchet arms 16, 18 on the main shaft 20. The ratchet wheel 24 is free to rotate independently from the ratchet arms 16, 18. The ratchet wheel 24 includes four equally circumferentially spaced teeth 26 that are formed around a circumferential outer surface 28 of a drive wheel portion 30 of the ratchet wheel 24. A drive pawl 32 is connected between the ratchet arms 16, 18 and is positioned and constructed to engage each of the teeth 26, sequentially. The ratchet arms 16, 18 and the drive pawl 32 then cause the ratchet wheel 24 to rotate in one direction each time the drive pawl 32 engages one of the teeth 26 and moves toward the second position from the first position. The ratchet arms 16, 18 cause the drive pawl 32 to disengage from each of the four teeth 26, in turn, whenever the ratchet arms 16, 18 move from the second position to return to the first position. As best shown in FIG. 1, ratchet wheel rotation is coupled to a conveyor 12 mechanism to cause a conveyor 12 belt to advance in one direction in discrete steps. Depending on the size of the parts that the conveyor 12 is intended to carry, the apparatus 10 may cause the conveyor 12 to increment forward in steps of from six inches to 36 inches.

Four ratchet wheel stop detents 34 or notches are formed in equally spaced locations, 90 degrees apart, around an outer circumferential surface 36 of a locking wheel portion 38 of the ratchet wheel 24. The apparatus 10 also includes a detent engagement member 40 that is moveably supported on the frame 14 in a position to be moved into engagement with each of these ratchet wheel stop detents 34, in sequence, whenever the ratchet arms 16, 18 are in the second position. The detent engagement member 40 is constructed to positively hold the ratchet wheel 24 when engaged with any of the ratchet wheel stop detents 34. In other words, when engaged by the detent engagement member 40, the locking wheel 38 and the drive wheel portions 30 of the ratchet wheel 24 are locked against rotation in either direction, thus locking the attached conveyor 12 against motion in either direction. The detent engagement member 40 is also constructed to allow ratchet wheel 24 rotation only after having been fully disengaged from the ratchet wheel stop detents 34.

In the present embodiment the detent engagement member 40 is a "locking pawl" 40 that includes a head portion 42 extending from an elongated arm portion 44 in a direction tangential to the main shaft 20 and perpendicular to the arm portion 44. The locking pawl 40 is supported on the frame 14 adjacent the locking wheel portion 38 of the ratchet wheel 24 in a position to pivot the head 42 into and out of engagement with each ratchet wheel stop detent 34. More specifically, the locking pawl 40 is supported to pivot in the plane of rotation of the locking wheel 38 on a pivot pin 46 disposed parallel to the main shaft 20.

The head portion 42 of the locking pawl 40 has a generally rectangular shape complementing that of each ratchet wheel stop detent 34. The complementary rectangular shape of the locking pawl head portion 42 provides a positive engagement between the locking pawl 40 and each stop detent 34 to minimize any ratchet wheel 24 and conveyor 12 movement when in conveyor dwell positions. In other embodiments the detent engagement member 40 may be of any suitable configuration capable of positively engaging each stop detent 34 and minimizing ratchet wheel 24 and conveyor 12 movement when so engaged.

The drive wheel 30 and locking wheel 38 are coupled to one another and are supported coaxially to rotate together on the main shaft 20. The drive wheel 30 is disposed axially adjacent the locking wheel 38 in the present embodiment but may, in other embodiments, be spaced from (while remaining coupled to) the locking wheel 38.

The apparatus 10 also includes a locking pawl actuator 48 that operatively connects the ratchet arm to the locking pawl 40. This actuator 48 is constructed to disengage the locking pawl 40 from the ratchet wheel stop detents 34 before each movement of the ratchet arms 16, 18 out of the second position and, therefore, before each incremental rotational movement of the ratchet wheel 24. The locking pawl actuator 48 is also constructed to disengage the locking pawl 40 from each ratchet wheel stop detent 34, in turn, in response to each movement of the ratchet arms 16, 18 from the second position back toward the first position.

The locking pawl actuator 48 includes a mechanical linkage 50 that drivingly connects the ratchet arms 16, 18 to the locking pawl 40. This linkage 50 is constructed to disengage the locking pawl 40 from the ratchet wheel stop detent 34 in response to each movement of the ratchet arms 16, 18 toward the second position from the first position. The mechanical linkage 50 is also constructed such that ratchet arm movement out of the first position is what physically drives the locking pawl 40 out of engagement with the ratchet wheel stop detent 34.

As best shown in FIG. 2A, the mechanical linkage 50 includes a narrow, elongated roller engagement track 52 that is defined by a diagonal edge of a generally trapezoidal side abutment 54 of the locking pawl 40 that faces a first ratchet arm 16 of the two ratchet arms 16, 18. The roller engagement track 52 has a length that is oriented perpendicular to the main shaft 20 and is spaced from the main shaft 20. The track 52 in inclined lengthwise approximately 30 degrees from horizontal.

A roller 56 is rotatably supported on the first ratchet arm 16 for rotation about a horizontal roller axis 58 that is oriented parallel to and is spaced from the main shaft 20. The roller axis 58 is perpendicular to the length of the roller engagement track 52. As best shown in FIGS. 2A and 6, the roller 56 is laterally movable to an aligned position where the roller 56 can engage and roll along the length of the roller engagement track 52 when the first ratchet arm 16 is pivoted an initial 10 degrees out of the first position. The roller engagement track 52 and roller 56 are oriented such that roller 56 movement along the roller engagement track 52 causes the locking pawl 40 to pivot away from the locking wheel portion 38 of the ratchet wheel 24 and to disengage from the ratchet wheel stop detent 34. Once the roller 56 has rolled off an upper end 60 of the roller engagement track 52, the locking pawl 40, which is urged by an adjustable locking pawl biasing spring 62 toward the locking wheel 38, springs back into contact with the now rotating locking wheel 38. The locking pawl 40 will then slide along the outer circumferential surface 36 of the rotating locking wheel 38 until it reaches another stop detent 34 and snaps into engagement with that stop detent.

The roller 56 is supported at a distal end of a lever 66 that is pivotally supported on the first ratchet arm 16. The lever 66 pivots laterally inward toward the locking pawl 40 in a plane perpendicular to a plane of motion of the locking pawl 40. This inward pivoting motion moves the roller 56 along an arcuate path between an aligned and a non-aligned position best shown in FIGS. 6 and 7, respectively. The lever 66 is spring biased toward the aligned position.

In the non-aligned position the lever 66 is in a generally vertical orientation where the roller 56 is not aligned with the roller engagement track 52 and both the lever 66 and the roller 56 are clear of the path of the locking pawl 40. In the aligned position, the roller 56 is vertically aligned with the roller engagement track 52. The lever 66 and roller 56 will yield to the locking pawl 40 by moving to the non-aligned position as the first ratchet arm 16 returns from the second position to the first position.

Each of the four teeth 26 formed in the outer circumferential surface 28 of the drive wheel portion 30 of the ratchet wheel 24 includes a leading pawl engagement surface 68 that defines a plane oriented parallel to and intersecting a rotational axis 70 of the ratchet wheel 24. Each tooth 26 also includes an elongated arcuate convex cam surface 72 that extends from a radially outer edge of that tooth's pawl engagement surface 68 to a radially inner edge of the succeeding tooth's pawl engagement surface 68.

A drive pawl 32 is pivotally connected between the first and second ratchet arms 16, 18 in a position to sequentially engage one of the leading pawl engagement surfaces 68 of the teeth 26 each time the ratchet drive 22 moves the ratchet arms 16, 18 from the first to the second position. An engagement end 78 of the drive pawl 32 includes a tooth engagement surface 80 shaped to engage the leading pawl engagement surface 68 of each tooth 26 each time the ratchet arms 16, 18 move from their first to their second position. The drive pawl 32 is biased radially inward relative to the drive wheel 30 to hold the engagement end 78 of the drive pawl 32 in engagement with the outer circumferential surface 28 of the drive wheel 30. The radially inward bias causes the engagement end 78 of the drive pawl 32 to slide along the cam surface 72 of a tooth 26 and into engagement with the leading pawl engagement surface 68 of a succeeding tooth 26 during each forward stroke of the ratchet arms 16, 18.

The engagement end 78 of the drive pawl 32 also includes a pawl cam surface 82 at a distal end of the drive pawl 32. The pawl cam surface 82 is shaped so that, whenever the ratchet arms 16, 18 are rotated from the second back to the first position, the engagement end 78 of the drive pawl 32 is allowed to disengage one tooth 26 and slide along the cam surface of an adjacent tooth 26, until it drops into engagement with the adjacent tooth's leading pawl engagement surface 68.

The ratchet drive 22 has a stroke length sufficient to pivot the ratchet arms 16, 18 through an arc of approximately 100 degrees during each "forward stroke" from the first to the second position and, likewise, on each "backstroke" from the second position back to the first position. Because the radian measure of each backstroke is 100 degrees and the four drive wheel teeth 26 are spaced only 90 degrees apart, the drive pawl 32 is pulled 10 degrees past the leading drive pawl engagement surface 68 of each tooth 26 on each backstroke. This causes the drive pawl 32 to remain disengaged from the drive wheel portion 30 of the ratchet wheel 24 during the first 10 degrees of each 100 degree forward stroke.

During the first 10 degrees of each forward stroke the first ratchet arm 16 and the lever 66 are positioned to carry the roller 56 into engagement with the roller engagement track 52 of the locking pawl 40 and then to roll along the roller engagement track 52 while the ratchet wheel 24 remains motionless. Being pivotally supported in the plane of rotation of the locking wheel 38, movement of the roller 56 along the track 52 will pull the locking pawl 40 away from the locking wheel portion 38 of the ratchet wheel 24 and out of engagement. After completing the first 10 degrees of the forward stroke, the drive pawl 32 is then positioned to reach and engage the leading drive pawl engagement surface 68 of the next drive wheel tooth 26 and to rotate the ratchet wheel 24 through 90 degrees of rotation as ratchet arms 16, 18 complete the remaining 90 degrees of their forward stroke.

In practice, the conveyor ratcheting apparatus 10 advances a conveyor 12 in one direction in discrete steps as follows: The ratchet drive 22 first begins to rotate the ratchet arms 16, 18 through the first 10 degrees of their forward stroke causing the lever 66 pivotally attached to the first ratchet arm 16 to raise with the first ratchet arm 16. Raising the lever 66 causes the roller 56 to engage the roller engagement track 52 formed on the locking pawl 40, rotating the pawl against the biasing spring 62, and withdrawing the pawl from engagement with the locking wheel portion 38 of the ratchet wheel 24. Thus, in the first 10 degrees of rotation of the ratchet arms 16, 18 10, the ratchet wheel 24 does not rotate, and, as a result, the apparatus 10 does not advance the conveyor 12, but the locking pawl 40 is retracted.

Further rotation of the ratchet arms 16, 18 through the remaining 90 degrees of arc causes the ratchet wheel 24 to rotate. The rotation of the ratchet wheel 24 is coupled to the conveyor 12 and causes the conveyor 12 to advance. The ratchet wheel 24 rotates until the next stop detent 34 comes into alignment with the locking pawl 40, and the biasing spring 62 causes the locking pawl 40 to engage the stop detent 34 in the locking wheel 38. This engagement occurs at the end of the forward stroke of the ratchet drive 22 and ratchet arms 16, 18.

The ratchet drive 22 then begins to extend, pushing the ratchet arms 16, 18 along their backstroke toward the first position. This motion of the first ratchet arm 16 carries the lever 66 across the locking pawl 40 which causes the lever 66 and roller 56 to rotate through a small angle away from the locking wheel portion 38 of the ratchet wheel 24. As the ratchet arms 16, 18 continue to rotate toward the first position, the lever 66 and roller 56 yield to and pass around the locking pawl 40. This repositions the roller 56 below the roller engagement track 52. From this position, the ratchet arms 16, 18 are free to pivot along their forward stroke and the roller 56 can re-engage the roller engagement track 52 on the locking pawl 40, once again rotating the locking pawl 40 out of engagement, freeing the ratchet wheel 24 for rotation.

This description is intended to illustrate certain embodiments of the invention rather than to limit the invention. Therefore, it uses descriptive rather than limiting words.

Obviously, it's possible to modify this invention from what the description teaches. Within the scope of the claims, one may practice the invention other than as described.

What is claimed is:

1. A conveyor ratcheting apparatus for advancing a conveyor in one direction in discrete steps, the apparatus comprising:
    a frame;
    a first ratchet arm pivotally supported on the frame for movement relative to the frame between first and second radially-spaced positions and configured to be driven between the first and second positions by a ratchet actuator;
    a ratchet wheel rotatably supported on the frame; at least two circumferentially spaced teeth formed in the ratchet wheel, the ratchet arm configured to sequentially engage each of the teeth and cause the ratchet wheel to rotate in one direction each time the ratchet arm engages one of the teeth and moves toward the second position from the first position, the ratchet arm configured to disengage each time the ratchet arm moves from the second position to return to the first position;
    a first ratchet wheel stop detent formed in the ratchet wheel;
    a detent engagement member movably supported on the frame in a position to be moveable into engagement with the first ratchet wheel stop detent when the first ratchet arm is in the second position, the detent engagement member being configured to positively hold the ratchet wheel when engaged with the first ratchet wheel stop detent and to allow ratchet wheel rotation out of the second position only after being disengaged from the ratchet wheel stop detent;
    an actuator operatively connected to the detent engagement member and configured to disengage the detent engagement member from the ratchet wheel stop detent before the ratchet wheel is rotated out of the second position, the actuator being configured to disengage the detent engagement member from the ratchet wheel stop detent in response to ratchet arm movement.

2. A conveyor ratcheting apparatus as defined in claim 1 in which the actuator:
    includes a mechanical linkage drivingly connecting the first ratchet arm to the detent engagement member; and
    is configured to disengage the detent engagement member from the ratchet wheel stop detent in response to ratchet arm movement toward the second position.

3. A conveyor ratcheting apparatus as defined in claim 2 in which the actuator is configured such that ratchet arm movement out of the first position drives the detent engagement member out of engagement with the ratchet wheel stop detent.

4. A conveyor ratcheting apparatus as defined in claim 2 in which the mechanical linkage includes:
    a roller engagement track disposed on the detent engagement member; and
    a roller supported on the first ratchet arm in a position to engage and roll along the roller engagement track when the first ratchet arm is pivoted out of the first position, the roller engagement track and roller being oriented such that roller movement along the roller engagement track causes the detent engagement member to disengage from the ratchet wheel stop detent.

5. A conveyor ratcheting apparatus as defined in claim 1 in which the detent engagement member is spring biased toward the ratchet wheel and into engagement with the ratchet wheel stop detent.

6. A conveyor ratcheting apparatus as defined in claim 4 in which:
    the roller is supported on a lever that is pivotally supported on the first ratchet arm; and
    the lever is positioned and configured to pivot the roller between an aligned position where the roller is aligned with the roller engagement track and a non-aligned position where the roller is not aligned with the roller engagement track and is out of the path of the detent engagement member, the lever and roller being positioned to move to the non-aligned position as the first ratchet arm returns from the second position to the first position, and to pivot to the non-aligned position.

7. A conveyor ratcheting apparatus as defined in claim 6 in which the lever is spring biased toward the aligned position.

8. A conveyor ratcheting apparatus as defined in claim 6 in which:
    the first ratchet arm, lever and roller are positioned and configured to disengage the detent engagement member from the ratchet wheel stop detent during a first portion of the first ratchet arm's motion from the first to the second position; and
    the first ratchet arm is positioned and configured to engage and rotate the ratchet wheel during a second portion of the first ratchet arm's motion from the first to the second position.

9. A conveyor ratcheting apparatus as defined in claim 1 in which:
    a second ratchet arm is pivotally supported on the frame and is connected to the first ratchet arm for parallel movement with the first ratchet arm relative to the frame between the first and second positions and is configured to be driven between the first and second positions by the ratchet actuator; and
    a ratchet pawl is connected between the first and second ratchet arms in a position to engage the ratchet wheel when the ratchet arms are driven from the first to the second position.

10. A conveyor ratcheting apparatus as defined in claim 1 in which the ratchet wheel is rotatably supported with the ratchet arms on a common main shaft supported on the frame.

11. A conveyor ratcheting apparatus as defined in claim 1 in which the ratchet wheel includes:
    a driven wheel; and a locking wheel coupled to the driven wheel, the teeth being formed in the driven wheel and the first ratchet wheel stop detent being formed in the locking wheel.

12. A conveyor ratcheting apparatus as defined in claim 1 in which the ratchet wheel includes three additional ratchet wheel stop detents, the four ratchet wheel stop detents being equally spaced around an outer circumferential surface of the ratchet wheel.

13. A conveyor ratcheting apparatus a defined in claim 1 in which the ratchet wheel includes four teeth formed into an outer circumferential surface of the ratchet wheel.

14. A conveyor ratcheting apparatus as defined in claim 1 in which:

the detent engagement member is a locking pawl including a tangentially-extending head having a shape complementing that the ratchet wheel stop detent; and the locking pawl is pivotally supported on the frame in a position to pivot the head into and out of engagement with the ratchet wheel stop detent.

* * * * *

UNITED STATES PATENT AND TRADEMARK OFFICE
CERTIFICATE OF CORRECTION

PATENT NO.    : 6,443,296 B1
DATED         : September 3, 2002
INVENTOR(S)   : Jason A. McNamara et al.

It is certified that error appears in the above-identified patent and that said Letters Patent is hereby corrected as shown below:

Column 7,
Line 52, after "detent" insert -- and --.

Column 8,
Line 33, after "position" (first occurrence), delete the comma (,).

Column 10,
Line 5, after "that" insert -- of --.

Signed and Sealed this

Fourth Day of February, 2003

JAMES E. ROGAN
*Director of the United States Patent and Trademark Office*